US012645101B2

(12) United States Patent
Tang et al.

(10) Patent No.: US 12,645,101 B2
(45) Date of Patent: Jun. 2, 2026

(54) TANTALUM NITRIDE RESISTIVE HEATER FOR THERMALLY-TUNABLE PHOTONICS DEVICES

(71) Applicant: Newport Fab, LLC, Newport Beach, CA (US)

(72) Inventors: Zhirong Tang, Lake Oswego, OR (US); Oleg Martynov, Lebanon, NH (US); Edward Preisler, San Clemente, CA (US)

(73) Assignee: Newport Fab, LLC, Newport Beach, CA (US)

( * ) Notice: Subject to any disclaimer, the term of this patent is extended or adjusted under 35 U.S.C. 154(b) by 790 days.

(21) Appl. No.: 17/967,159

(22) Filed: Oct. 17, 2022

(65) Prior Publication Data

US 2024/0126107 A1 Apr. 18, 2024

(51) Int. Cl.
G02F 1/01 (2006.01)
H05B 3/14 (2006.01)
(52) U.S. Cl.
CPC ........... G02F 1/0147 (2013.01); H05B 3/143 (2013.01)
(58) Field of Classification Search
CPC .............................. G02F 1/0147; H05B 3/143
See application file for complete search history.

(56) References Cited

U.S. PATENT DOCUMENTS

| | | | | |
|---|---|---|---|---|
| 10,768,365 | B2* | 9/2020 | Zheng | G02B 6/136 |
| 11,296,482 | B2* | 4/2022 | Preisler | H01S 5/0203 |
| 2019/0293863 | A1* | 9/2019 | Zheng | G02B 6/136 |
| 2021/0218225 | A1* | 7/2021 | Preisler | H01S 5/0218 |

OTHER PUBLICATIONS

Coenen et al., Electromigration Performance Improvement of Metal Heaters for Si Photonic Ring Modulators, in IEEE Transactions on Device and Materials Reliability, vol. 22, No. 3, pp. 417-423, Sep. 2022, doi: 10.1109/TDMR.2022.3187822. (Year: 2022).*
Shostachenko et al., Thermal stability of tantalum nitride based thin film resistors. IOP Conference Series: Materials Science and Engineering. 2019. 498. 012014. 10.1088/1757-899X/498/1/012014 (Year: 2019).*
Lee et al., On-chip thermo-optic tuning of suspended microresonators, Opt. Express 25, 12109-12120 (2017) (Year: 2017).*
Masood et al., Comparison of heater architectures for thermal control of silicon photonic circuits, 10th International Conference on Group IV Photonics, Seoul, Korea (South), 2013, pp. 83-84, doi: 10.1109/Group4.2013.6644437. (Year: 2013).*

* cited by examiner

*Primary Examiner* — Peter Radkowski
(74) *Attorney, Agent, or Firm* — Farjami & Farjami LLP

(57) ABSTRACT
A semiconductor structure has a substrate and a thermally-tunable photonics device in or over the substrate. A tantalum nitride (TaN) resistive heater is over the substrate and proximate to the thermally-tunable photonics device. The TaN resistive heater is configured to tune the thermally-tunable photonics device.

19 Claims, 10 Drawing Sheets

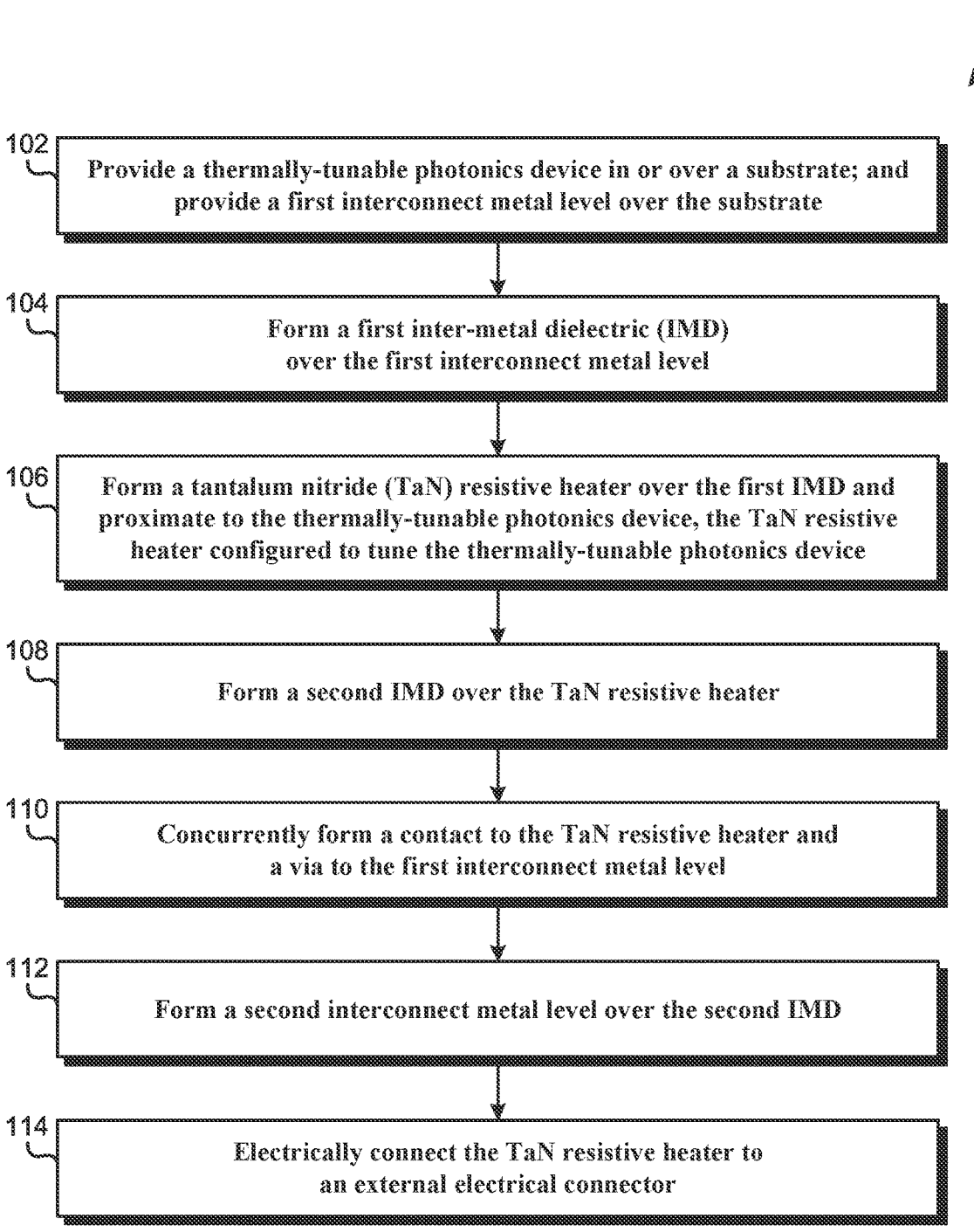

100

102 Provide a thermally-tunable photonics device in or over a substrate; and provide a first interconnect metal level over the substrate 104 Form a first inter-metal dielectric (IMD) over the first interconnect metal level 106 Form a tantalum nitride (TaN) resistive heater over the first IMD and proximate to the thermally-tunable photonics device, the TaN resistive heater configured to tune the thermally-tunable photonics device 108 Form a second IMD over the TaN resistive heater 110 Concurrently form a contact to the TaN resistive heater and a via to the first interconnect metal level 112 Form a second interconnect metal level over the second IMD 114 Electrically connect the TaN resistive heater to an external electrical connector

TANTALUM NITRIDE RESISTIVE HEATER FOR THERMALLY-TUNABLE PHOTONICS DEVICES

BACKGROUND

Photonics devices are commonly utilized in data communications and other fields such as imaging and health care. Various applications of photonics devices, such as interferometers, phase shifters, and optical switches, can utilize a thermo-optical effect to affect changes in optical properties (such as phase, amplitude, wavelength, etc.). In one approach, a heater is introduced to assist in producing the desired thermo-optical effect in the photonics device.

However, conventional resistive heater designs have relatively high temperature coefficients. When current flows through the conventional resistive beaters, and as their temperature increases, they experience greater changes in resistance due to their high temperature coefficients. In turn, a driving circuit needs to make greater adjustments in supplied power, making it more difficult to maintain the conventional heater at a constant temperature. In order to accurately tune the desired thermo-optical effect in the photonics device, complex driving circuitry and relatively high power consumption are sometimes required.

Thus, there is a need in the art for a semiconductor structure that can efficiently tune a thermally-tunable photonics device.

SUMMARY

The present disclosure is directed to a tantalum nitride resistive heater for thermally-tunable photonics devices, substantially as shown in and/or described in connection with at least one of the figures, and as set forth in the claims.

BRIEF DESCRIPTION OF THE DRAWINGS

FIG. 1 illustrates a flowchart of an exemplary method for forming a semiconductor structure according to one implementation of the present application.

FIG. 6 illustrates a semiconductor structure processed in accordance with the flowchart of FIG. 1 according to one implementation of the present application.

DETAILED DESCRIPTION

Figure 2:
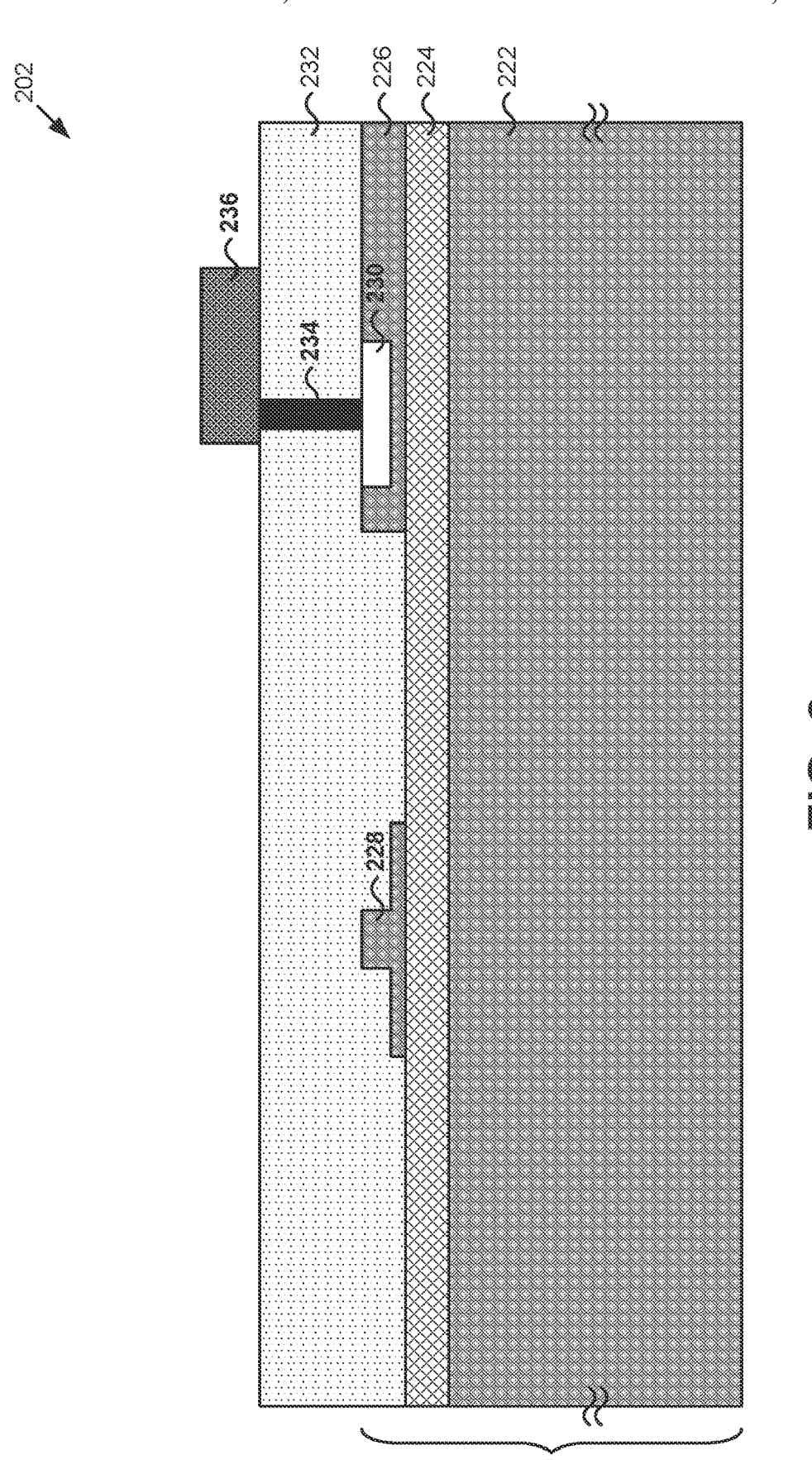
FIG. 2 illustrates a semiconductor structure processed in accordance with the flowchart of FIG. 1 according to one implementation of the present application.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Figure 3:
FIG. 3 illustrates a semiconductor structure processed in accordance with the flowchart of FIG. 1 according to one implementation of the present application.

FIG. 1 illustrates a flowchart of an exemplary method for forming a semiconductor structure according to one implementation of the present application. Structures shown in FIGS. 2 through 8 illustrate the results of performing actions 102 through 114 shown in flowchart 100 of FIG. 1. For example, FIG. 2 shows a semiconductor structure after performing action 102 in FIG. 1, FIG. 3 shows a semiconductor structure after performing action 104 in FIG. 1, and so forth.

Actions 102 through 114 shown in flowchart 100 of FIG. 1 are sufficient to describe one implementation of the present inventive concepts. Other implementations of the present inventive concepts may utilize actions different from those shown in the flowchart of FIG. 1. Certain details and features have been left out of the flowchart that are apparent to a person of ordinary skill in the art. For example, an action may consist of one or more sub-actions or may involve specialized equipment or materials, as known in the art. Moreover, some actions, such as masking and cleaning actions, are omitted so as not to distract from the illustrated actions.

FIG. 2 illustrates a semiconductor structure processed in accordance with action 102 in the flowchart of FIG. 1 according to one implementation of the present application. As shown in FIG. 2, in semiconductor structure 202, substrate 220 is provided with thermally-tunable photonics device 228 in substrate 220. A first interconnect metal level, including metal interconnect 236, is also provided over substrate 220. Also shown in semiconductor structure 202 in FIG. 2 are device 230, pre-metal dielectric 232, and contact 234.

In the present implementation, substrate 220 is an SOI substrate including handle wafer 222, buried oxide (BOX) 224, and semiconductor layer 226. In providing substrate 220, a bonded and etch back SOI (BESOI) process can be used, as known in the art. In a BESOI process, handle wafer 222, BOX 224, and semiconductor layer 226 together form an SOI substrate. Alternatively, as also known in the art, a SIMOX process (separation by implantation of oxygen process) or a "smart cut" process can also be used for providing substrate 220. In a SIMOX process, handle wafer 222 can be a bulk silicon support wafer (which for ease of reference, may still be referred to as a "handle wafer" in the present application). Similar to a BESOI process, in both SIMOX and smart cut processes, handle wafer 222, BOX 224, and semiconductor layer 226 together form an SOI substrate.

In one implementation, handle wafer 222 is undoped bulk silicon. In various implementations, handle wafer 222 can comprise germanium, group III-V material, or any other suitable handle material. In various implementations, handle wafer 222 has a thickness of approximately seven hundred microns (700 μm) or greater or less. In one implementation, a trap rich layer can be situated between handle wafer 222 and BOX 224. In various implementations, BOX 224 typically comprises silicon dioxide ($SiO_2$), but it may also comprise silicon nitride ($Si_xN_Y$), or another insulator material. In various implementations, BOX 224 has a thickness of approximately one micron (1 μm) or greater or less. In one implementation, semiconductor layer 226 includes monoc-rystalline silicon. In various implementations, semiconductor layer 226 can comprise germanium, group III-V material, or any other semiconductor material. In various implementations, semiconductor layer 226 has a thickness of approximately three hundred nanometers (300 nm) or greater or less. Handle wafer 222, BOX 224, and semiconductor layer 226 can be provided together in semiconductor structure 202 as a pre-fabricated SOI substrate. In various implementations, substrate 220 may be another type of substrate other than an SOI substrate.

Substrate 220 includes thermally-tunable photonics device 228. In semiconductor structure 202, thermally-tunable photonics device 228 is formed by patterning semiconductor layer 226. Part of semiconductor layer 226 is removed to isolate thermally-tunable photonics device 228 from the rest of semiconductor layer 226 and device 230. In other implementations, dedicated isolation structures can be used. Thermally-tunable photonics device 228 is any type of photonics device that experiences a thermo-optical effect. That is, thermally-tunable photonics device 228 is any type of photonics device capable of varying an optical property (such as phase, amplitude, wavelength, etc.) in response to changes in temperature. In various implementations, thermally-tunable photonics device 228 can be an interferometer, a phase shifter, a waveguide, or an optical switch.

Substrate 220 also includes device 230 situated in semiconductor layer 226. In various implementations, device 230 can be a transistor, an operational amplifier, a driver, a filter, a mixer, or a diode. In various implementations, device 230 can be an active circuit comprising multiple active devices, or comprising passive devices in combination with at least one active device. Other devices (not shown in FIG. 2) can also be integrated in substrate 220. For example, additional thermally-tunable photonics devices can be situated in semiconductor layer 226. In various implementations, thermally-tunable photonics devices can be situated over substrate 220, instead of (or in addition to) in substrate 220.

Pre-metal dielectric (PMD) 232 is situated over substrate 220. In particular, PMD 232 is situated over semiconductor layer 226, and thermally-tunable photonics device 228, and device 230. PMD 232 aids formation and processing of multi-level metallization components, such as integrated passive devices (IPDs), metal interconnects, contacts/vias, and bond pads. In various implementations, PMD 232 can comprise borophosphosilicate glass (BPSG), tetra-ethyl ortho-silicate (TEOS), $SiO_2$, $Si_xN_Y$, silicon oxynitride ($Si_xO_YN_Z$), or another dielectric. PMD 232 can be formed be depositing and planarizing a dielectric layer.

Contact 234 is situated in PMD 232. Contact 234 connects device 230 in semiconductor layer 226 to metal interconnect 236 in the first interconnect metal level. In one implementation, a contact hole is etched in PMD 232 over device 230, a metal is deposited in the contact hole, and then planarized with PMD 232, for example, using chemical mechanical polishing (CMP), thereby forming contact 234. In an alternative implementation, a damascene process is used to form contact 234. In various implementations, contact 234 can comprise tungsten (W), copper (Cu), or aluminum (Al).

In semiconductor structure 202 in FIG. 2, a first interconnect metal level (i.e., M1), including metal interconnect 236, is provided over substrate 220. In one implementation, a metal layer is deposited over PMD 232 and contact 234, and then segments thereof are etched, thereby forming metal interconnect 236. In an alternative implementation, a damascene process is used to form metal interconnect 236. In various implementations, metal interconnect 236 can comprise W, Al, or Cu.

Although contact 234 and metal interconnect 236 are separate formations in FIG. 2, in other implementations they may be parts of the same formation. Semiconductor structure 202 can include other contacts and other metal interconnects not shown in FIG. 2. For example, in one implementation thermally-tunable photonics device 228 is an optoelectronic device, and a contact is situated in PMD 232 connecting thermally-tunable photonics device 228 to another metal interconnect in M1.

FIG. 3 illustrates a semiconductor structure processed in accordance with action 204 in the flowchart of FIG. 1 according to one implementation of the present application. As shown in FIG. 3, in semiconductor structure 204, a first inter-metal dielectric (IMD) 238a is formed over the first interconnect metal level (i.e., over M1). In particular, first IMD 238a is formed over metal interconnect 236 and PMD 232.

As described below, first IMD 238a can be part of a pair of IMDs separating two consecutive interconnect metal levels (e.g., M1 and M2). In various implementations, the thickness of first IMD 238a can be approximately half the thickness of interlayer dielectrics separating other consecutive interconnect metal levels (e.g., M2 and M3) or less. For example, if other interlayer dielectrics separating consecutive metal levels (not shown in FIG. 3) have thicknesses of approximately five hundred angstroms (500 Å), first IMD 238a can have a thickness of approximately two hundred and fifty angstroms (250 Å) or less. IMD 238a can be formed be depositing and planarizing a dielectric layer. In various implementations, first IMD 238a can comprise $SiO_2$, $Si_xN_Y$, or $Si_xO_YN_Z$.

Figure 4:
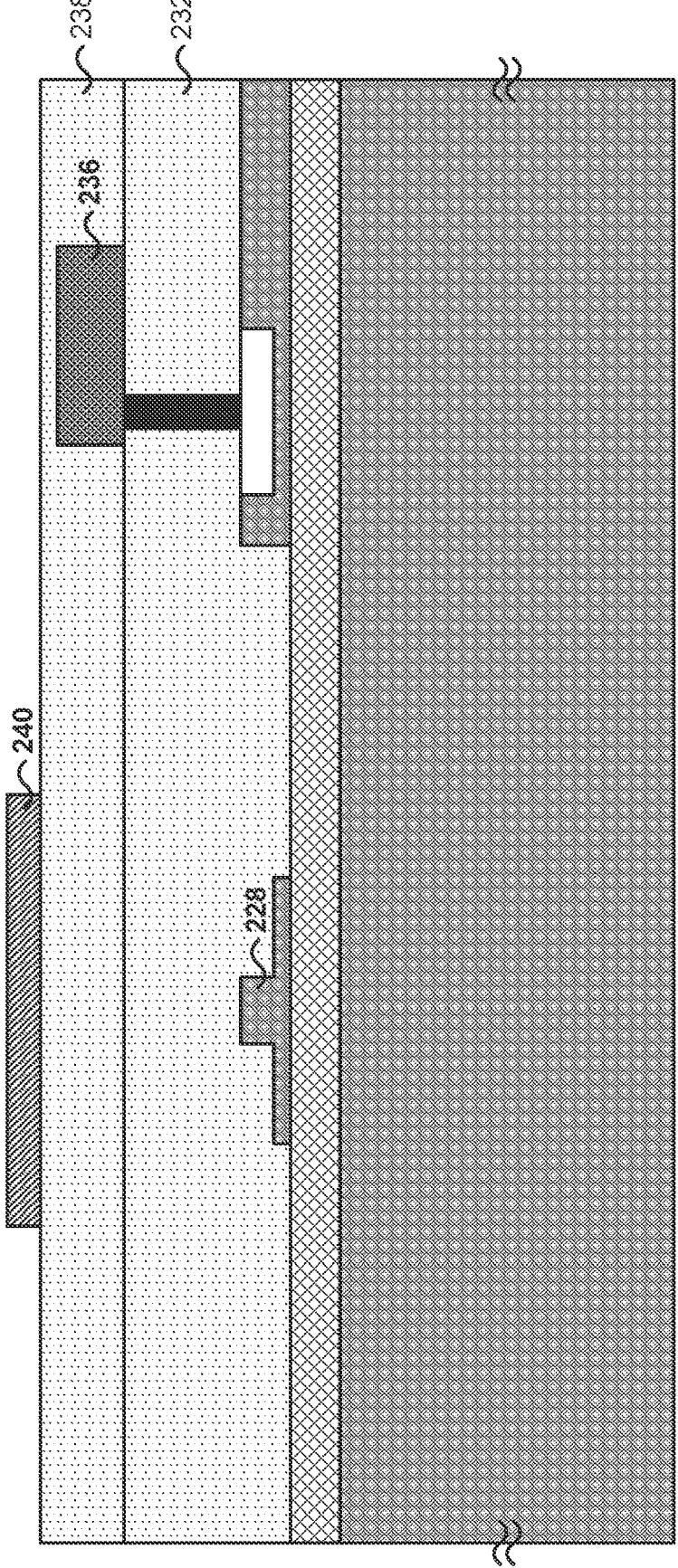
FIG. 4 illustrates a semiconductor structure processed in accordance with the flowchart of FIG. 1 according to one implementation of the present application.

FIG. 4 illustrates a semiconductor structure processed in accordance with action 106 in the flowchart of FIG. 1 according to one implementation of the present application. As shown in FIG. 4, in semiconductor structure 206, tantalum nitride (TaN) resistive heater 240 is formed over first IMD 238a and proximate to thermally-tunable photonics device 228. TaN resistive heater 240 is configured to tune thermally-tunable photonics device 228.

TaN resistive heater 240 comprises TaN, and generates heat via Joule heating. TaN resistive heater 240 can be electrically connected to a power source (not shown in FIG. 4) in subsequent actions. When TaN resistive heater 240 is supplied with power, it generates heat. When heat generated by TaN resistive heater 240 reaches thermally-tunable photonics device 228, the thermo-optical effect varies an optical property (such as phase, amplitude, wavelength, etc.) of thermally-tunable photonics device 228. In turn, optical properties of thermally-tunable photonics device 228 can be tuned through a range of values.

The position and orientation of TaN resistive heater 240 relative to thermally-tunable photonics device 228, can be chosen such that heat generated by TaN resistive heater 240 readily reaches thermally-tunable photonics device 228 and TaN resistive heater 240 is configured to tune thermally-tunable photonics device 228. In the present implementation, TaN resistive heater 240 overlies thermally-tunable photonics device 228. In one implementation, a length of TaN resistive heater 240 and a length of thermally-tunable photonics device 228 can be substantially parallel. In one implementation, a length of TaN resistive heater 240 can be substantially perpendicular to a portion of thermally-tunable photonics device 228 to be tuned. In various implementations, TaN resistive heater 240 can be situated centrally with respect to multiple thermally-tunable photonics devices. Likewise, in various implementations, multiple TaN resistive heaters are situated proximate to thermally-tunable photonics device 228.

The dimensions of TaN resistive heater 240 can also be chosen such that heat generated by TaN resistive heater 240 readily reaches thermally-tunable photonics device 228 and TaN resistive heater 240 is configured to tune thermally-tunable photonics device 228. In the present implementation, TaN resistive heater 240 is a thin film resistive heater. In various implementations, TaN resistive heater has a thickness of between approximately one hundred angstroms (100 Å) and one thousand angstroms (1,000 Å). In various implementations, the thicknesses and materials of first IMD 238a and PMD 232 can be chosen to facilitate TaN resistive heater 240 tuning thermally-tunable photonics device 228.

TaN resistive heater 240 can be formed by depositing a TaN layer, for example, using chemical vapor deposition (CVD), plasma enhanced chemical vapor deposition (PECVD), or physical vapor deposition (PVD), and patterning the TaN layer using a chlorine-based plasma etch. TaN resistive heater 240 can be also be formed using any metal thin film technique known in the art. By appropriately controlling the stoichiometry of TaN resistive heater 240 (e.g., by appropriately selecting the ratio of tantalum to nitrogen), the temperature coefficient of TaN resistive heater 240 can be kept close to zero. In various implementations, TaN resistive heater 240 has a temperature coefficient of approximately zero plus or minus approximately fifty parts per million per degree Centigrade (0±50 ppm/° C.).

It is noted that TaN resistive heater 240 is formed over IMD 238a at level where conventionally no metal interconnect exists. As shown in FIG. 4, TaN resistive heater 240 is not situated at the same interconnect metal level as metal interconnect 236 (i.e., is not situated at M1). TaN resistive heater 240 resistor layer can be formed in a dedicated step, where a metal interconnect is not also formed from the same layer. As described below, TaN resistive heater 240 can be situated between two consecutive interconnect metal levels (e.g., between M1 and M2).

Figure 5:
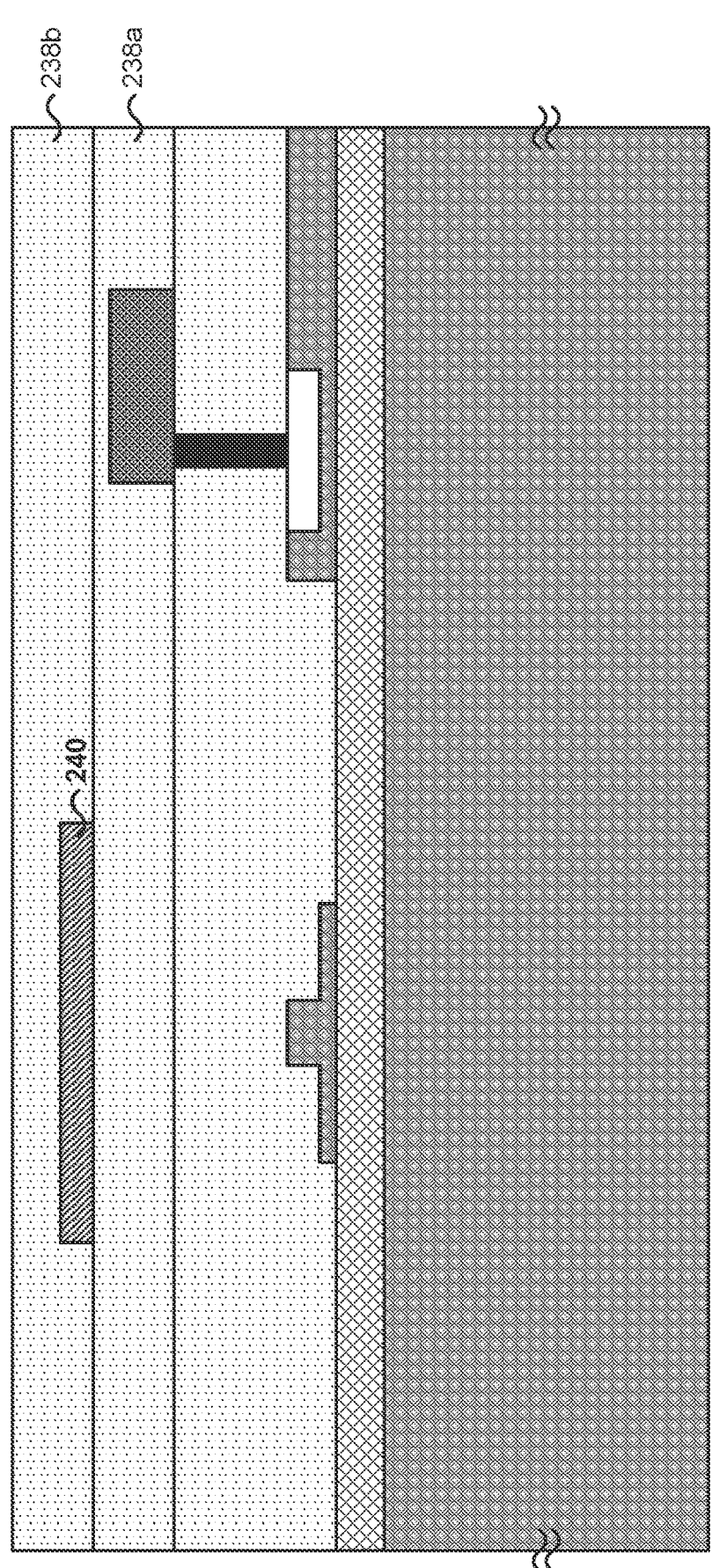
FIG. 5 illustrates a semiconductor structure processed in accordance with the flowchart of FIG. 1 according to one implementation of the present application.

FIG. 5 illustrates a semiconductor structure processed in accordance with action 108 in the flowchart of FIG. 1 according to one implementation of the present application. As shown in FIG. 5, in semiconductor structure 208, second IMD 238b is formed over TaN resistive heater 240. Second IMD 238b is also formed over first IMD 238a.

Second IMD 238b can be formed in a similar manner to first IMD 238a, and may have any implementations described above. In particular, in various implementations, the thickness of second IMD 238b can be approximately half the thickness of interlayer dielectrics separating other consecutive interconnect metal levels (e.g., M2 and M3) or less. For example, if other interlayer dielectrics separating consecutive metal levels (not shown in FIG. 5) have thicknesses of approximately five hundred angstroms (500 Å), second IMD 238b can have a thickness of approximately two hundred and fifty angstroms (250 Å) or less.

Figure 6:
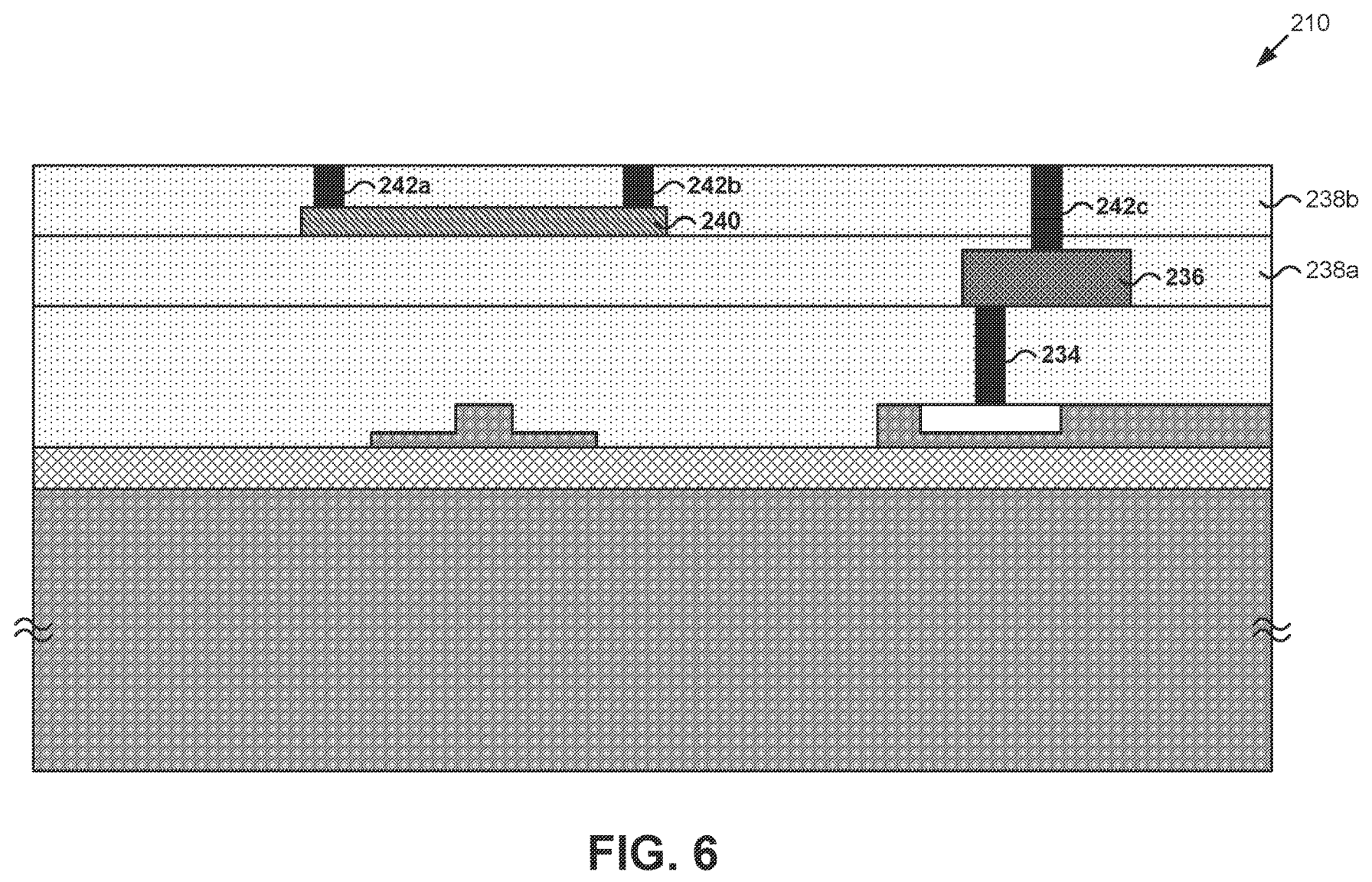

FIG. 6 illustrates a semiconductor structure processed in accordance with action 110 in the flowchart of FIG. 1 according to one implementation of the present application. As shown in FIG. 6, in semiconductor structure 210, contacts 242a and 242b to TaN resistive heater 240 and via 242c to the first interconnect metal level are concurrently formed. Contacts 242a and 242b are situated in second IMD 238b, and connect to TaN resistive heater 240. Via 242c is situated in both first IMD 238a and second IMD 238b, and connects to metal interconnect 236 in M1. Contacts 242a and 242b and via 242c can be formed in a similar manner to contact 234, and may have any implementations described above.

Figure 7:
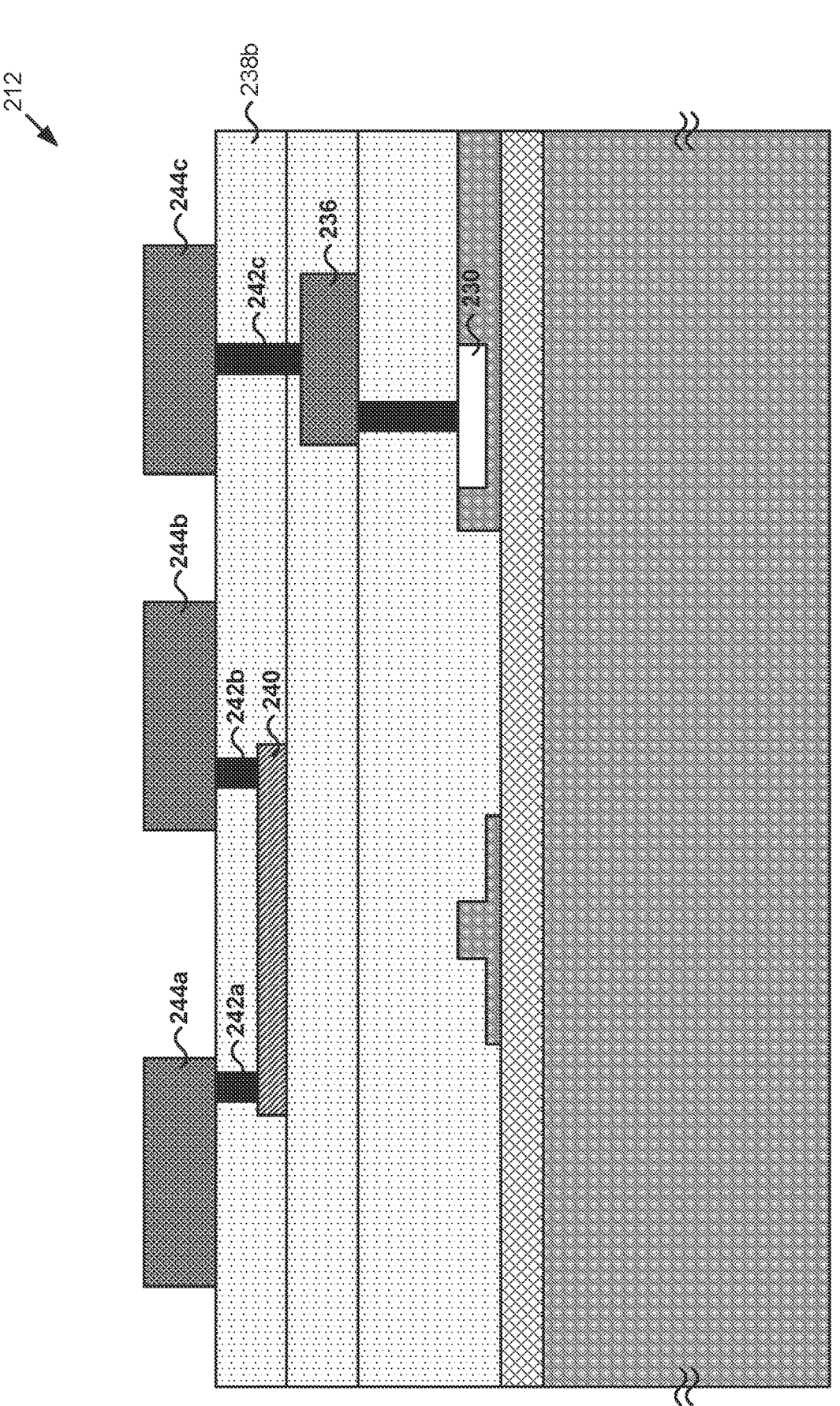
FIG. 7 illustrates a semiconductor structure processed in accordance with the flowchart of FIG. 1 according to one implementation of the present application.

FIG. 7 illustrates a semiconductor structure processed in accordance with action 112 in the flowchart of FIG. 1 according to one implementation of the present application. As shown in FIG. 7, in semiconductor structure 212, second interconnect metal level (i.e., M2) is formed over second IMD 238b.

M2 includes metal interconnects 244a, 244b, and 244c. Metal interconnects 244a, 244b, and 244c can be formed in a similar manner to metal interconnect 236, and may have any implementations described above. For example, in one implementation, a metal layer is deposited over second IMD 238b, contacts 242a and 242b, and via 242c, and then segments thereof are etched, thereby forming metal interconnects 244a, 244b, and 244c. Metal interconnects 244a and 244b connect respectively to contacts 242a and 242b to TaN resistive heater 240. Metal interconnect 244c connects to via 242c, which electrically connects to device 230.

In semiconductor structure 212 in FIG. 7, TaN resistive heater 240 is situated between two consecutive interconnect metal levels. (i.e., between M1 and M2). First IMD 238a and second IMD 238b are a pair of IMDs that together separate the two consecutive interconnect metal levels.

Figure 8:
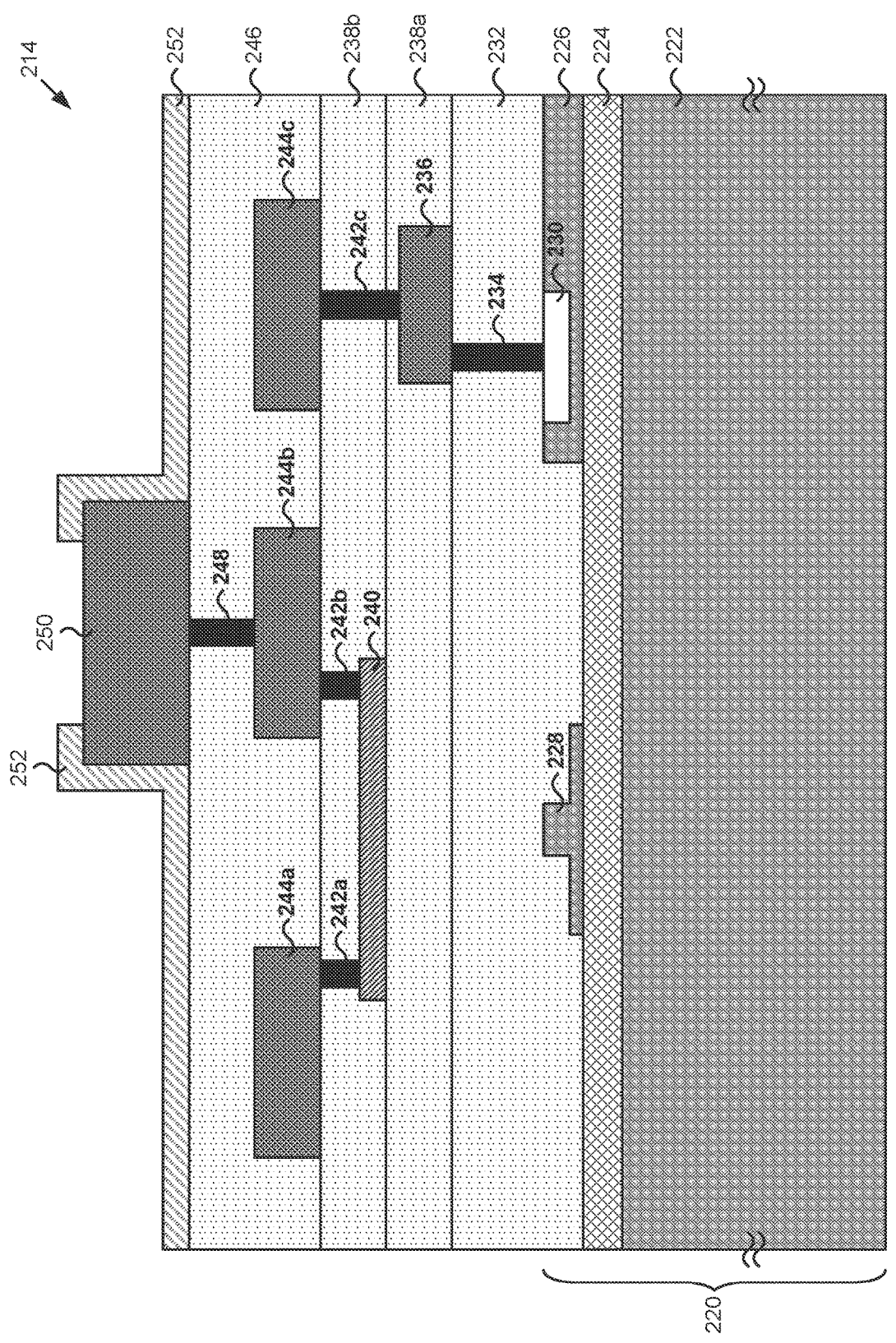
FIG. 8 illustrates a semiconductor structure processed in accordance with the flowchart of FIG. 1 according to one implementation of the present application.

FIG. 8 illustrates a semiconductor structure processed in accordance with action 114 in the flowchart of FIG. 1 according to one implementation of the present application. As shown in FIG. 8, in semiconductor structure 214, TaN resistive heater 240 is electrically connected to an external electrical connector 250. Also shown in FIG. 8 are interlayer dielectric 246, via 248, and passivation layer 252

Interlayer dielectric 246 is formed over the second interconnect metal level (i.e., over M2). In particular, interlayer dielectric 246 is over metal interconnects 244a, 244b, and 244c and over second IMD 238b. Interlayer dielectric 246 separates M2 from M3. In various implementations, interlayer dielectric 246 can comprise $SiO_2$, $Si_xN_y$, or $Si_xO_yN_z$. Interlayer dielectric 246 can be formed in a similar manner to PMD 232 or IMD 238a or IMD 238b, as described above. In various implementations, the thickness of interlayer dielectric 246 can be approximately the sum of the thicknesses of IMD 238a or IMD 238b.

Via 248 is situated in interlayer dielectric 246, and connects to metal interconnect 244b. Via 248 can be formed in a similar manner to via 242c, and may have any implementations described above. External electrical connector 250 is formed over interlayer dielectric 246 and via 248. In the present implementation, external electrical connector 250 is a metal interconnect of the third interconnect metal level (i.e., of M3).

Passivation layer 252 is formed over external electrical connector 250 and interlayer dielectric 246. In various implementations, passivation layer 252 can comprise $SiO_2$, $Si_xN_y$, or $Si_xO_yN_z$. In various implementations, passivation layer 252 can have a thickness of approximately fifty angstroms (50 Å) to two hundred angstroms (200 Å). In one implementation, passivation layer 252 can comprise multiple layers, such as a $Si_xO_y$ layer having a thickness of approximately twenty five angstroms (25 Å) to one hundred angstroms (100 Å) under a $Si_xN_y$ layer having a thickness of approximately twenty five angstroms (25 Å) to one hundred angstroms (100 Å).

A window in passivation layer 252 exposes a portion of external electrical connector 250 for electrical connection. External electrical connector 250 can function as a bond pad.

Thus, TaN resistive heater 240, which routes to external electrical connector 250, is configured for external electrical connection. The term "external" refers to external electrical connector 250 being able to electrically connect to a component external to semiconductor structure 214; the term "external" is not meant to imply that external electrical connector 250 itself is external to semiconductor structure 214. Semiconductor structure 214 in FIG. 8 represents a substantially complete semiconductor structure. External electrical connector 250 can later be electrically connected to a power source (not shown in FIG. 8) for driving TaN resistive heater 240.

In various implementations, TaN resistive heater 240 can be electrically connected to devices integrated in semiconductor structure 214, such as devices in semiconductor layer 226 of substrate 220. In one implementation, contact 242a to TaN resistive heater 240 and metal interconnect 244b can additionally or alternatively electrically connect to another external electrical connector in M3 (not shown in FIG. 8). In various implementations, external electrical connector 250 may be formed at a different metal level, such as at M2, M4, etc.

Figure 9:
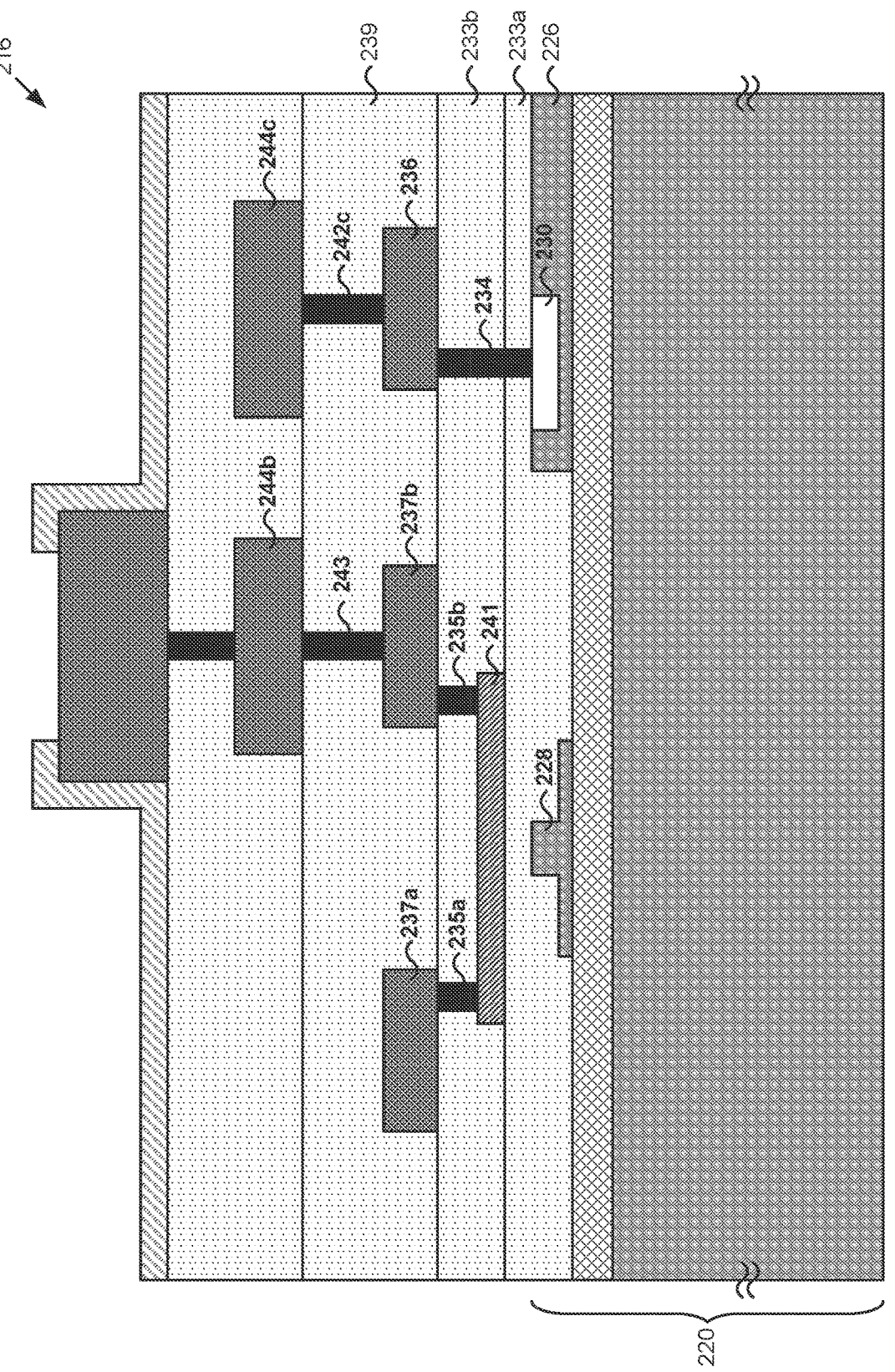
FIG. 9 illustrates a semiconductor structure processed according to one implementation of the present application.

FIG. 9 illustrates a semiconductor structure processed according to one implementation of the present application. Semiconductor structure 216 in FIG. 9 represents an alternative implementation to semiconductor structure 214 in FIG. 8. Except for differences noted below, components of semiconductor structure 216 in FIG. 9 generally correspond to like components in semiconductor structure 214 in FIG. 8, and may have any implementations and advantages described with respect thereto.

As shown in FIG. 9, in semiconductor structure 216, TaN resistive heater 241 is situated between substrate 220 and the first interconnect metal level (i.e., between substrate 220 and M1). First PMD 233a is formed over substrate 220, TaN resistive heater 241 is formed over first PMD 233a, and second PMD 233b is formed over TaN resistive heater 241. In various implementations, the thicknesses of first PMD 233a and second PMD 233b can each be approximately half the thickness of a conventional PMD, or approximately half the thickness of interlayer dielectric 239 or 246. Contacts 235a and 235b to TaN resistive heater 241 can be concurrently formed with contact 234 to device 230 in semiconductor layer 226. Contacts 235a and 235b are situated in second PMD 233b, and contact 234 is situated in both first PMD 233a and second PMD 233b. M1 is formed over second PMD 233b. M1 includes metal segment 237a, 237b, and 236 connected respectively to contacts 235a, 235b, and 234.

Interlayer dielectric 239, rather than a pair of IMDs, separates M1 including metal segment 237a, 237b, and 236 from M2 including metal segment 244b and 244c. Similarly, vias 242c and 243 are situated in interlayer dielectric 239, rather than in one or more IMDs. TaN resistive heater 241 routes through an additional metal segment 237b in M1 and an additional via 243 in interlayer dielectric 239 before reaching metal segment 244b in M2. Compared to TaN resistive heater 240 in FIG. 8, TaN resistive heater 241 in FIG. 9 is situated lower, closer to thermally-tunable photonics device 228.

Figure 10:
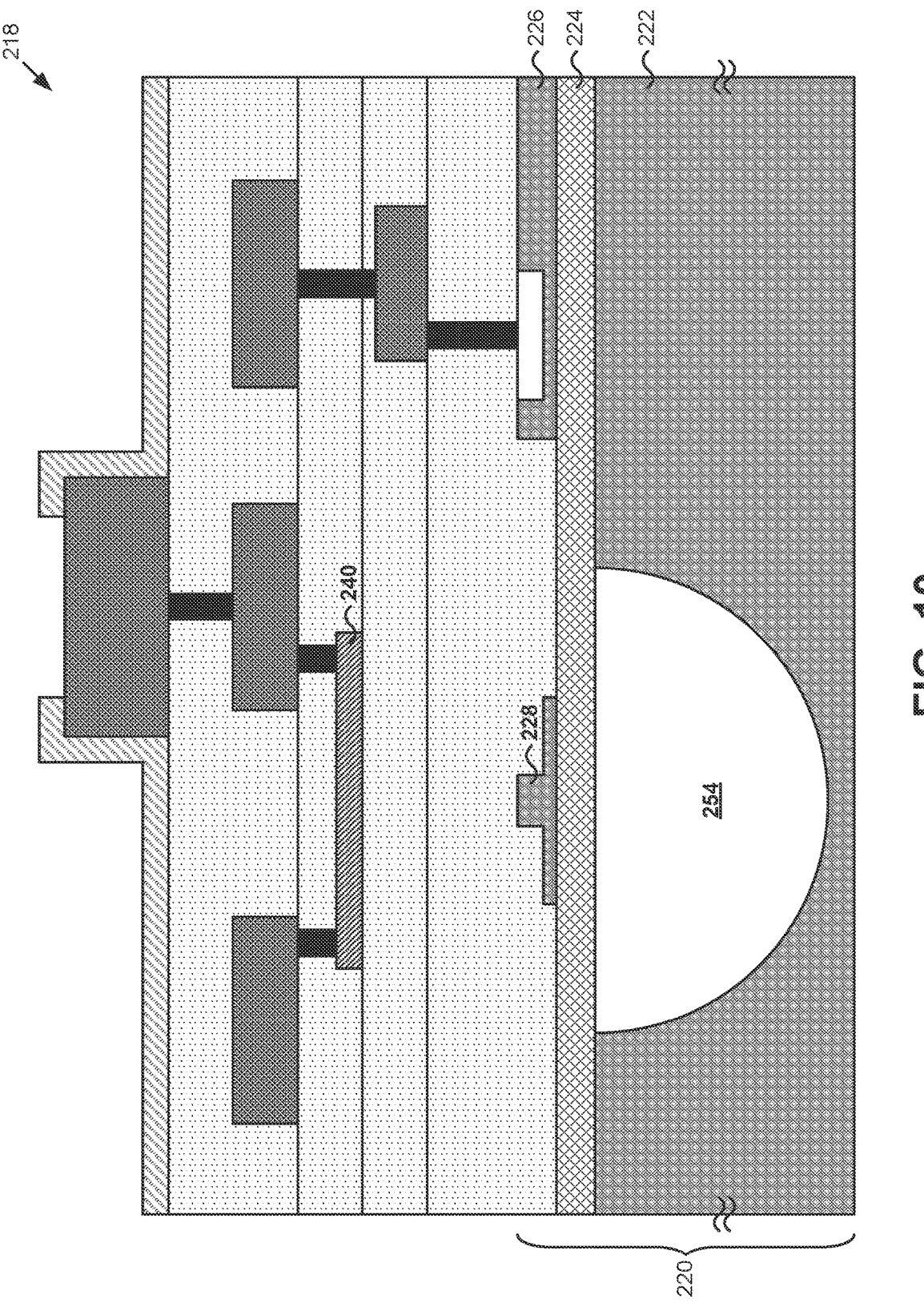
FIG. 10 illustrates a semiconductor structure processed according to one implementation of the present application.

FIG. 10 illustrates a semiconductor structure processed according to one implementation of the present application. Semiconductor structure 218 in FIG. 10 represents an alternative implementation to semiconductor structure 214 in FIG. 8. Except for differences noted below, components of semiconductor structure 218 in FIG. 10 generally correspond to like components in semiconductor structure 214 in FIG. 8, and may have any implementations and advantages described with respect thereto.

As shown in FIG. 10, in semiconductor structure 218, cavity 254 is formed is substrate 220 underlying TaN resistive heater 240. In particular, cavity 254 is situated in handle wafer 222 of substrate 220. In the present implementation, cavity 254 also underlies thermally-tunable photonics device 228.

An isotropic dry plasma etch, for example, using sulfur hexafluoride ($SF_6$), can be utilized to form cavity 254. Cavity 254 can be formed using an etch that is selective to handle wafer 222 such that BOX 224 remains substantially unetched. In the present implementation, cavity 254 is substantially spherical. Notably, cavity 254 is not etched to the backside of group IV substrate 230, to avoid cracking and/or mechanical instability. In the present implementation, cavity 254 is filled with air. In various implementations, cavity 254 can be filled with a material other than air. In one implementation, cavity 254 can be formed using a venting hole (not shown FIG. 10) that is later sealed by a pinch-off technique.

Cavity 254 in proximity to TaN resistive heater 240 significantly reduces heat dissipation from TaN resistive heater 240 to substrate 220. For example, in one implementation, handle wafer 222 can be monocrystalline Si, and its thermal conductivity can be approximately one hundred seventy watts per meter-kelvin (170 W/(m·K)). In contrast, cavity 254 can be filled with air, and its thermal conductivity can be approximately twenty five milliwatts per meter-kelvin (0.025 W/(m·K)). Because cavity 254 has lower thermal conductivity compared to handle wafer 222, the effective thermal conductivity of substrate 220 is reduced. Less heat dissipates from TaN resistive heater to substrate 220, and TaN resistive heater 240 requires less power to tune thermally-tunable photonics device 228.

Semiconductor structures according to the present invention, such as semiconductor structure 214 in FIG. 8, result in numerous advantages, some of which are stated below. First, TaN resistive heater 240 can have significantly lower temperature coefficient compared to conventional heaters for photonics devices. For example, in one implementation, a conventional titanium nitride (TiN) heater can have a high temperature coefficient of approximately five hundred and fifty parts per million per degree Centigrade (550 ppm/° C.). Accordingly, when the conventional TiN heater is on and its temperature increases, it will experience greater changes in resistance due to the high temperature coefficient. In turn, a driving circuit will need to make greater adjustments in supplied power, making it more difficult to maintain the conventional TiN heater at a constant temperature. In contrast, in various implementations, TaN resistive heater 240 has a temperature coefficient of approximately zero plus or minus approximately fifty parts per million per degree Centigrade (0±50 ppm/° C.). A driving circuit will need to make little or substantially no adjustments in supplied power to maintain TaN resistive heater 240 at a constant temperature. Thus, semiconductor structure 214 enables simplified driving circuitry and reduced power consumption.

Second, as a corollary to the first advantage, TaN resistive heater 240 can more easily tune thermally-tunable photonics device 228. Thus, semiconductor structure 214 enables more efficient applications of thermally-tunable photonics device 228, such as more efficient photonics modulators or encoders. Semiconductor structure 214 can also more efficiently compensate for process variation to correct otherwise unusable photonics devices.

Third, since TaN resistive heater 240 is patterned by itself in a dedicated step without also patterning other metal interconnects at the same level, TaN resistive heater 240 can be reliably formed.

Fourth, when TaN resistive heater 240 is formed in PMDs 233*a* and 233*b* situated between substrate 220 and M1 as in semiconductor structure 216 in FIG. 9, TaN resistive heater 241 is situated closer to thermally-tunable photonics device 228, and TaN resistive heater 241 more efficiently transfers heat to thermally-tunable photonics device 228. In turn, semiconductor structure 216 in FIG. 9 may be desirable for back ends where fewer levels are advantageous (e.g., small form factor applications, or applications exhibiting greater process variations when more levels are added) and for back ends whose materials have very low thermal conductivity.

Fifth, when cavity 254 is formed in substrate 220 underlying TaN resistive heater 240 as in semiconductor structure 218 in FIG. 10, TaN resistive heater 240 dissipates significantly less heat to substrate 220, and TaN resistive heater 240 requires significantly less power to tune thermally-tunable photonics device 228.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

The invention claimed is:

1. A semiconductor structure comprising:
a substrate;
at least one thermally-tunable photonics device in or over said substrate;
a tantalum nitride (TaN) resistive heater over said substrate and proximate to said at least one thermally-tunable photonics device, said TaN resistive heater configured to tune said at least one thermally-tunable photonics device;
wherein said TaN resistive heater is situated between two consecutive interconnect metal levels, or is situated over a first pre-metal dielectric (PMD) and under a second PMD.

2. The semiconductor structure of claim 1, wherein said TaN resistive heater overlies said at least one thermally-tunable photonics device.

3. The semiconductor structure of claim 1, wherein said at least one thermally-tunable photonics device comprises an interferometer, a phase shifter, a waveguide, or an optical switch.

4. The semiconductor structure of claim 1, wherein said TaN resistive heater is configured for external electrical connection.

5. The semiconductor structure of claim 1, wherein said substrate is a semiconductor-on-insulator (SOI) substrate.

6. The semiconductor structure of claim 1, further comprising a cavity in said substrate underlying said TaN resistive heater.

7. The semiconductor structure of claim 6, wherein:
said substrate is a semiconductor-on-insulator (SOI) substrate;
said cavity is situated in a handle wafer of said SOI substrate.

8. The semiconductor structure of claim 1, wherein said TaN resistive heater has a thickness of between approximately one hundred angstroms (100 Å) and one thousand angstroms (1,000 Å).

9. A semiconductor structure comprising:
a semiconductor-on-insulator (SOI) substrate;
at least one photonics device in or over said SOI substrate;
a tantalum nitride (TaN) resistive heater over said SOI substrate, said TaN resistive heater configured to tune said at least one photonics device;
wherein said TaN resistive heater is situated between two consecutive interconnect metal levels, or is situated over a first pre-metal dielectric (PMD) and under a second PMD.

10. The semiconductor structure of claim 9, wherein said TaN resistive heater overlies said at least one photonics device.

11. The semiconductor structure of claim 9, wherein said at least one photonics device comprises an interferometer, a phase shifter, a waveguide, or an optical switch.

12. The semiconductor structure of claim 9, wherein said TaN resistive heater is configured for external electrical connection.

13. The semiconductor structure of claim 9, wherein said TaN resistive heater has a thickness of between approximately one hundred angstroms (100 Å) and one thousand angstroms (1,000 Å).

14. The semiconductor structure of claim 9, further comprising a cavity in said SOI substrate underlying said TaN resistive heater.

15. The semiconductor structure of claim 14, wherein said cavity is situated in a handle wafer of said SOI substrate.

16. The semiconductor structure of claim 1, wherein said TaN resistive heater is situated between said two consecutive interconnect metal levels, over a first inter-metal dielectric (IMD) and under a second IMD.

17. The semiconductor structure of claim 1, wherein a thickness of said first IMD or said second IMD is approximately half a thickness of an interlayer dielectric separating another two consecutive interconnect metal levels.

18. The semiconductor structure of claim 14, wherein said TaN resistive heater is situated between said two consecutive interconnect metal levels, over a first inter-metal dielectric (IMD) and under a second IMD.

19. The semiconductor structure of claim 14, wherein a thickness of said first IMD or said second IMD is approximately half a thickness of an interlayer dielectric separating another two consecutive interconnect metal levels.

* * * * *